Jan. 1, 1952      A. C. FLETCHER      2,581,321
OUTSIDE METAL BLIND AND OPERATING MEANS THEREFOR
Filed March 25, 1949
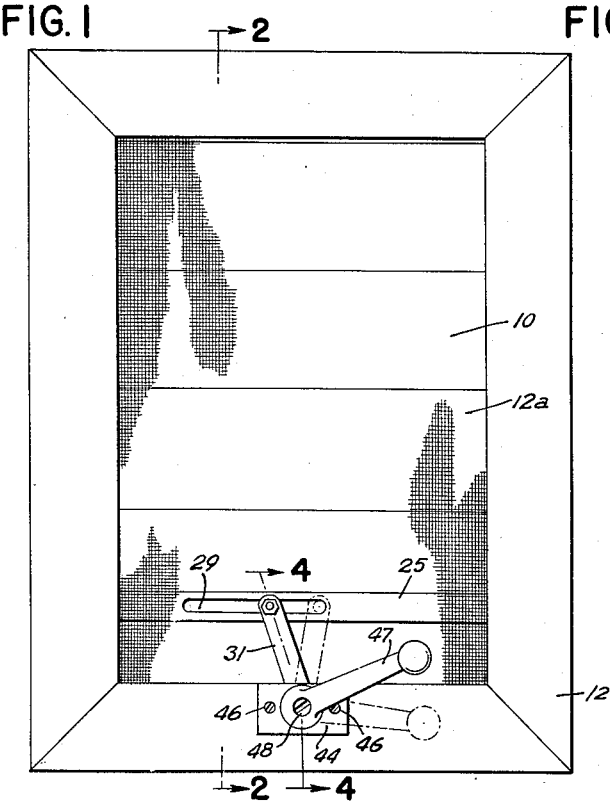
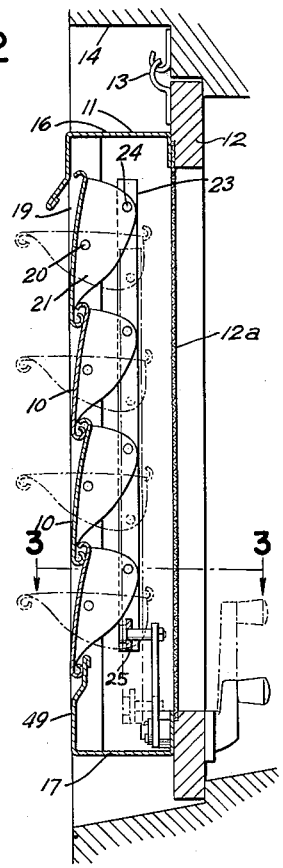
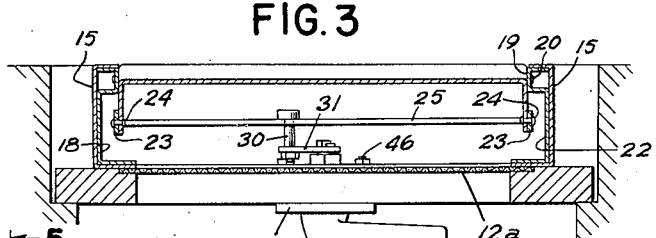
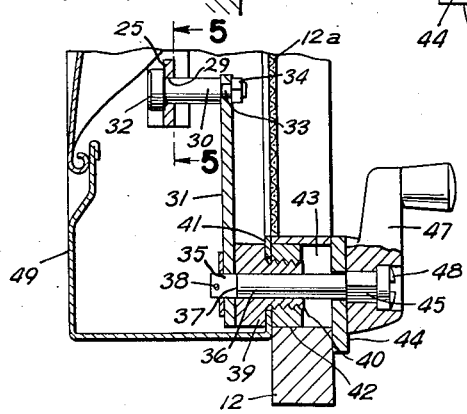
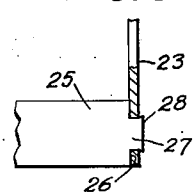
INVENTOR.
Albert C Fletcher
BY *Lancaster, Allwine and Rommel*
ATTORNEYS.

Patented Jan. 1, 1952

2,581,321

UNITED STATES PATENT OFFICE 2,581,321

OUTSIDE METAL BLIND AND OPERATING MEANS THEREFOR

Albert C. Fletcher, Oklahoma City, Okla., assignor to William H. Stewart, Oklahoma City, Okla.

Application March 25, 1949, Serial No. 83,426

2 Claims. (Cl. 189—62)

This invention relates to improvements in outside metal blinds and operating means therefor. The present invention relates more particularly to the shutter slat or louver operating mechanism, while the supporting frame structure disclosed is the subject matter of a copending application for outside metal blinds filed by William H. Stewart on March 25, 1949, bearing the Serial No. 83,469.

An object of the invention is to provide simple and inexpensive operating means for shutter slat or louver elements, which are horizontally disposed in a shutter frame and which will positively swing these shutter elements to various adjusted positions between an open position where the elements are in a horizontally disposed outwardly extending position to a closed position where the elements are swung downwardly into a vertical position, with the lower edges of the shutter elements overlapping the upper edges of the adjacent lower shutter elements.

Another object of the invention is to provide such an improved shutter operating means which will positively operate the shutter slats or louvers at both ends of said members, as by means of links connected with outer sides of extensions of pivotally mounted shutter end elements where the links may be operated in vertical channels in the frame structure at the inner side of the frame alongside the shutter member mounting side portion thereof. A cross bar connects the links and an inside manual operating crank so that there will be no middle operating bar to obstruct the view when the louvers are operated to open position.

Another object of the invention is to provide an improved shutter operating means operable on the interior of a window screen for moving the louvers from open to closed position and which is operable to positively lock the louvers, when in closed position, so that they cannot be swung open by manipulation on the outside of the window.

Further objects and advantages will appear in the following description of a highly satisfactory embodiment of the operating means for outside metal blinds in accordance with my invention supplemented by the accompanying drawings illustrating the same and forming a part of this specification.

In the drawings:

Fig. 1 is an inside elevation view of the outside metal blinds and operating means therefor in accordance with my invention.

Fig. 2 is a vertical sectional view thereof taken on line 2—2 of Fig. 1, an open position of the louvers being shown by dot and dash lines.

Fig. 3 is a transverse sectional view thereof taken on line 3—3 of Fig. 2.

Fig. 4 is a fragmental vertical sectional view of an enlarged scale taken on line 4—4 of Fig. 1 illustrating the connection between the interior operating crank and the cross bar for raising and lowering the louver operating links.

Fig. 5 is a fragmental vertical sectional view taken on line 5—5 of Fig. 4 illustrating a detail of the connection between the cross bar and louver operating links.

In general the drawings illustrate louvers 10, constituting blind or shutter elements, mounted in a metallic frame 11 secured to a wooden trim or screen frame 12 which may be supported by means of detachable hook members 13 in a window opening 14. A screen 12ª covers the inner side of metallic frame 11 and is secured in place on the outer surface of trim frame 12, between the abutting surfaces of the two frames. For purposes of illustration the shutter and frame organization is a small size, well adapted for vent windows of kitchens and the like showing the louvers and other parts on a larger scale than they would be if the window illustrated were larger, although the principles involved would be the same for such larger windows.

Metallic frame 11 includes outer side finishing channel members 15 and upper and lower end members 16 and 17 respectively within which side channels, inner louver mounting channel members 18 are housed. These channel members 18 each includes an inwardly projecting narrow channel 19 affording a mounting for pivot members 20 supporting end elements 21 of the louvers 10. To the inner side of channel 19 is an outwardly extending wider channel 22, the outer surface of which engages the inner surface of its respective side channel member 15. These channels 22 provide spaces for the operation of vertical links 23 therein, which are connected by pivots 24 with the end elements 21 of louvers 10 in corresponding positions of each end element offset from the pivots 20 at both ends of the louvers 10 so that the louvers may be opened or closed in unison by moving the links 23 down or up respectively in each of the channels. Further details of construction of the louvers 10 and metallic frame structure 11 appear in the above referred to copending application of William H. Stewart.

The lower ends of links 23 are rigidly connected to the ends of a cross bar 25, the ends of which are reduced to provide shoulders 26 which engage the inner sides of links 23. The intermediate projections 27 of cross bar 25 extend through corresponding apertures in the links 23 and have their ends 28 upset beyond the links to provide permanent rigid connections with the links as shown in the detail Fig. 5.

The intermediate portion, substantially the mid portion, of cross bar 25 is provided with a longitudinal slot 29 in which an operating pin 30, on the free end of a crank lever 31, forming a part of the louver operating means, is adapted to reciprocate as best shown in Figs. 1 and 4. This pin 30 has an enlarged head 32 on its outer end adapted to engage the outer surface of cross bar 25 and prevent it from becoming disengaged therefrom. The inner end of pin 30 is provided with a threaded extension 33 which extends through an aperture in the end of crank lever 31 and a nut 34 threaded thereon securely holds the pin in place.

The other end of the swinging operating member or crank lever 31 has a rectangular or other irregular shaped opening, adapting it to slide on the reduced correspondingly shaped end 35 of an operating shaft 36 where it is secured against abutting shoulders 37 of the shaft by means of a cotter pin 38 or the like extending through a hole therefor in the end 35 so as to engage the outer side of lever 31. Shaft 31 extends through a bearing member 39 which has a reduced threaded end 40 extending inwardly through an opening in the mid portion of an upwardly extending flange 41 of the lower end member 17 of frame 11, and a nut 42 on threaded end 40 secures the bearing in position.

Screen frame 12 is provided with an aperture 43 for accommodating the inner end of bearing member 39 with its securing nut 42 thereon and shaft 36 carried thereby. Shaft 36 extends through a finishing plate 44 on the interior surface of frame 12 and has a preferably enlarged square end portion 45 engaging and extending inwardly from plate 44. Plate 44, frame 12 and the upwardly extending flange 41 of the frame lower end member 17 are provided with apertures for the reception of bolts 46, as shown in Figs. 1 and 3, which maintain the plate 44 and the frames at this point in assembled relationship. An operating crank 47 has a squared recess which fits the squared end 45 of shaft 36 and a set screw 48 removably secures crank 47 in place on shaft 36. This connection of crank 47 with shaft 36 allows the crank to be positioned on the shaft so as to substantially overlie the crank lever 31 as may be preferable in some instances, or in the position indicated, substantially 90° from the lever 31, in which position the relation of the parts are more clearly illustrated.

In operation with the crank lever 31 in the position shown in Figs. 1 and 2, the louver or shutter elements 10 are closed upon each other. By swinging operating lever 47 counterclockwise through substantially 90°, thereby swinging crank lever 31 the same amount, pin 30 will move to the left in slot 29 in cross bar 25 moving it downwardly with links 23 thereby swinging louvers or shutter elements 10 to a horizontal open position with cross bar 25 depressed to a position below the top of the outer upright flange 49 of the lower frame member 17, as shown in dotted line positions in Fig. 2, where none of the louver operating parts will obstruct the view between the open louvers 10 except the operating lever, which when mounted as shown will extend upwardly in a vertical position. If the operating lever 47 is mounted to overlie crank lever 31 it too will be swung below the upper edge of the lower end flange 49 of frame 11.

As pointed out above with the crank lever 31 in the position shown in Fig. 1, the louvers are fully closed. By swinging lever 31 further to the right, as provided for by the extension of slot 29, crank lever 31 may be swung with pin 30 by that extent, the resiliency of bar 25 and associated parts connected therewith, yielding to permit pin 30 to be carried over the center of shaft 36 and when pin 30 is so positioned in the right-hand end of slot 29 the shutter elements will be locked in closed position.

Having described a preferred highly satisfactory embodiment of operating means for outside metal blinds it is to be understood that various changes in detail may be made within the scope of my invention as set forth in the following claims.

I claim:

1. Operating means for outside metal blinds and the like wherein laterally pivoted shutter elements are mounted one above another so as to swing a horizontal open position or to a vertical closed position, a link at each end of the shutter elements connected with each of the shutter elements so that they may be swung thereby in unison between their fully opened and closed positions, a cross bar having its ends rigidly connected with the lower ends of said links, said cross bar having a longitudinal slot in its intermediate portion, and an operating member therefor including a crank lever having a pin in its upper end engaging the longitudinal slot in the cross bar, a pivotally mounted shaft connected with the lower end of said crank lever, and an operating crank on the other end of said shaft.

2. Operating means for outside metal blinds and the like wherein laterally pivoted shutter elements are mounted one above another so as to swing to a horizontal open position or to a vertical closed position, a link at each end of the shutter elements connected with each of the shutter elements so that they may be swung thereby in unison between their fully opened and closed positions, a cross bar having its ends rigidly connected with the lower ends of said links, said cross bar having a longitudinal slot in its intermediate portion, and an operating member therefor including a crank lever having a pin in its upper end engaging the longitudinal slot in the cross bar, a pivotally mounted shaft connected with the lower end of said crank lever, and an operating crank on the other end of said shaft for swinging said lever to raise or lower said cross bar to close or open the shutter elements and to swing the crank lever beyond the shutter closing position to position the crank pin in the end of the slot in the cross bar on the opposite side of the pivotally mounted shaft to yieldingly maintain the shutter elements locked in their closed position.

ALBERT C. FLETCHER.

REFERENCES CITED

The following references are of record in the file of this patent:

UNITED STATES PATENTS

| Number | Name | Date |
| --- | --- | --- |
| 182,992 | Byam | Oct. 10, 1876 |
| 1,550,559 | Miller | Aug. 18, 1925 |
| 2,164,814 | Griffith | July 4, 1939 |
| 2,311,300 | Dubour et al. | Feb. 16, 1943 |
| 2,359,289 | Brown | Oct. 3, 1944 |
| 2,419,635 | Faulkner | Apr. 29, 1947 |